US006992974B1

(12) United States Patent
Tripathi

(10) Patent No.: US 6,992,974 B1
(45) Date of Patent: Jan. 31, 2006

(54) SYSTEM AND METHOD FOR PROVIDING FAULT TOLERANCE IN A NETWORK TELEPHONY SYSTEM

(75) Inventor: Anoop Tripathi, Mount Prospect, IL (US)

(73) Assignee: 3Com Corporation, Marlborough, MA (US)

( * ) Notice: Subject to any disclaimer, the term of this patent is extended or adjusted under 35 U.S.C. 154(b) by 1013 days.

(21) Appl. No.: 09/685,286

(22) Filed: Oct. 10, 2000

(51) Int. Cl.
*H04J 1/16* (2006.01)
(52) U.S. Cl. .................. 370/216; 370/352; 370/474
(58) Field of Classification Search ................ 370/216, 370/217, 218, 219, 220, 221, 352, 474
See application file for complete search history.

(56) References Cited

U.S. PATENT DOCUMENTS

| | | | | |
|---|---|---|---|---|
| 5,774,465 A | * | 6/1998 | Lau et al. ................ | 370/395.3 |
| 6,473,396 B1 | * | 10/2002 | Kumar ........................ | 370/220 |
| 6,507,562 B1 | * | 1/2003 | Kadansky et al. .......... | 370/216 |

OTHER PUBLICATIONS

Handley/Schulzrinne/Schooler/Rosenberg, SIP: Session Initiation Protocol, Internet Engineering Task Force, draft-ietf-sip-rfc2543bis-02.ps. Sep. 4, 2000. (131 pages).

H. Schulzrinne et al., "RTP: A Transport Protocol for Real-Time Applications", IETF RFC 1889, Jan. 1996.
J. Postel, "User Datagram Protocol", IETF RFC 768, Aug. 1980.
J. Postel, ed., "Internet Protocol", IETF RFC 791, Sep. 1981.

\* cited by examiner

*Primary Examiner*—Huy D. Vu
*Assistant Examiner*—Daniel Ryman
(74) *Attorney, Agent, or Firm*—McDonnell Boehnen Hulbert & Berghoff LLP

(57) ABSTRACT

A system and method for providing fault tolerance in a network telephony system. Signaling messages according to a signaling protocol, such as the SIP protocol, are modified to include a path attribute with a network address corresponding to a backup proxy server. When a primary proxy server is supported by a backup proxy server, the primary proxy server inserts the Alternate Path tag into one or more signaling messages. When a network entity sends a message, it checks the message to identify the primary proxy server. Upon receiving a failure or timeout when attempting to send to the primary proxy server, the sending network entity should try the backup proxy server specified in the path attribute. When the backup proxy server receives the message, it may modify the message to specify the new routing path. As a result, subsequent messages get routed properly using the backup proxy server.

10 Claims, 8 Drawing Sheets

SYSTEM AND METHOD FOR PROVIDING FAULT TOLERANCE IN A NETWORK TELEPHONY SYSTEM

FIELD OF THE INVENTION

The present invention relates to network telephony systems. More particularly, the present invention relates to providing fault tolerance in a network telephony system.

BACKGROUND OF THE INVENTION

As the quality of network telephony systems has improved, there has been a migration of users from the traditional PSTN (Public Switched Telephone Network) to network telephony systems. With the proliferation of the Internet, Internet telephony has enabled distantly located users to communicate with one another using data protocols underlying the Internet. For example, the IP (Internet Protocol) suite along with various signaling protocols has made IP telephony a popular form of network telephony.

The Session Initiation Protocol (SIP) is a signaling protocol that may be used to assist with call set-up, management, and teardown. Other signaling protocols, such as the ITU-T H.323, MEGACO, and MGCP protocols, may also be used to implement various signaling functions. While these network telephony systems have provided advantages in cost and flexibility, certain challenges have arisen. In particular, network telephony systems are expected to meet the same standards of reliability, fault-tolerance, and availability as present in today's PSTN network.

One specific problem that has arisen in IP telephony systems is how to route signaling messages when intermediate nodes fail. Currently, at least two schemes have been used to address this problem: (1) DNS (Domain Name System) name path specifications, and (2) transfers to stand-by servers. In the first solution, as an alternative to using the IP address of a server in the path between a caller and a callee, the DNS name of the server is used. When a server fails, the DNS is notified of the IP address of a back-up server. Future DNS look-ups will point to the back-up server. This solution, however, may be slow to detect failures, and does not work well for distributed DNS server systems. In the second solution, an active server periodically transfers state information to a back-up server. If a failure occurs, the back-up server takes over. This solution is also subject to several shortcomings. In particular, there is no mechanism to inform the next-hop servers about the change to the back-up server. As a result, this second solution typically only works in proprietary environments with provisioning.

Thus, it would be desirable to provide a mechanism for providing fault tolerance in a network telephony system.

BRIEF DESCRIPTION OF THE DRAWINGS

Preferred embodiments of the present invention are described with reference to the following drawings, wherein.

DETAILED DESCRIPTION

A. Network Telephony System

Figure 1:
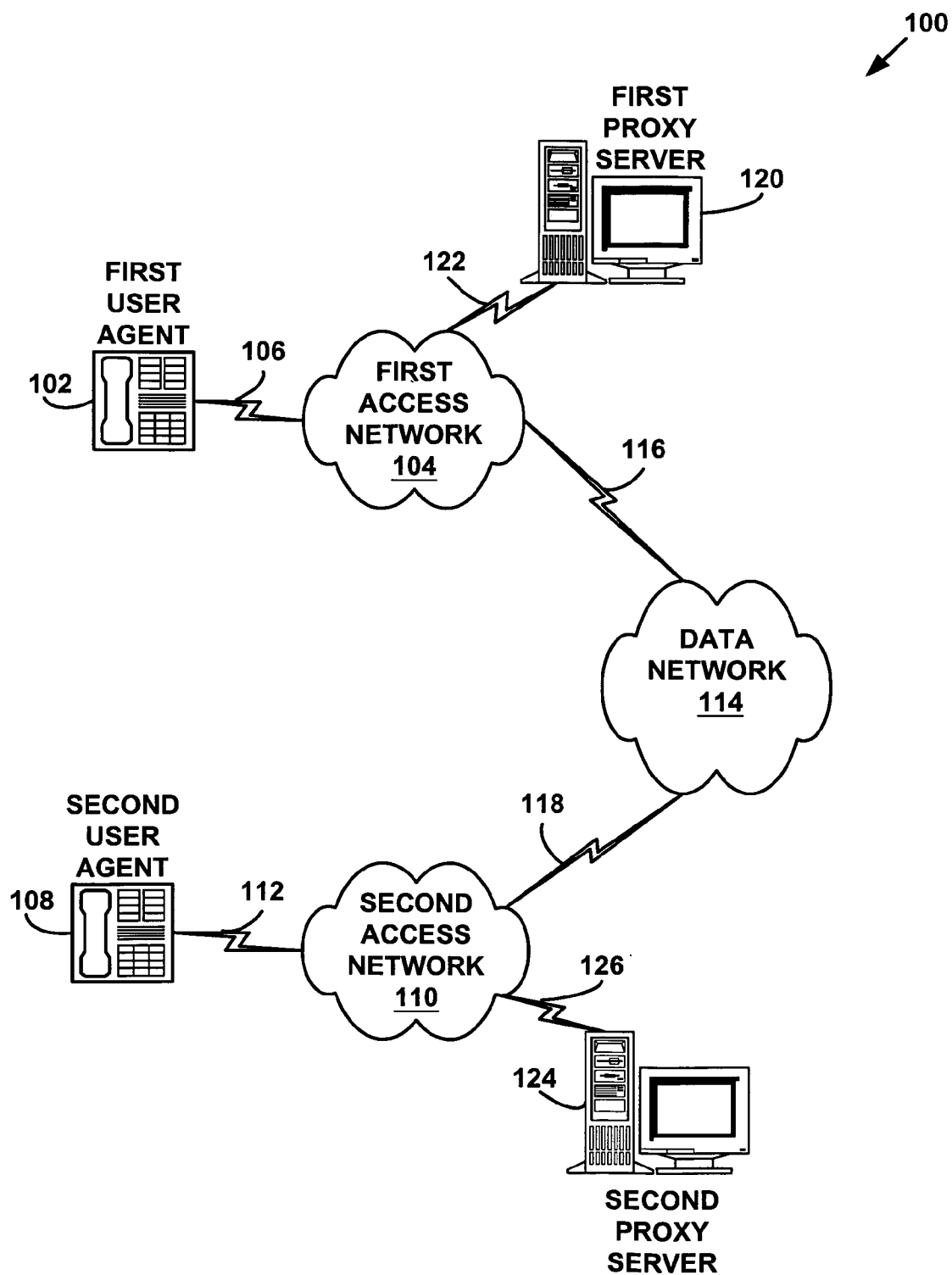
FIG. 1 is a simplified block diagram illustrating a typical network telephony system in which an exemplary embodiment of the present invention can be implemented.

FIG. 1 is a simplified block diagram illustrating a typical network telephony system 100 in which an exemplary embodiment of the present invention can be implemented. The system 100 includes a first user agent 102 communicatively linked to a first access network 104 by link 106. A second user agent 108 is linked to a second access network 110 by link 112. Network entities on the first access network 104 may communicate with network entities on the second access network 110 through a data network 114, such as the public Internet, linking the first access network 104 to the second access network 110 by links 116 and 118, respectively. A first proxy server 120 linked to the first access network 104 by link 122 and a second proxy server 124 linked to the second access network 110 by link 126 may be used to perform routing of signaling requests and responses. The links shown in the system 100 may be hard-wired or wireless links, and they may include intermediate network entities and/or networks. For example, the links 116 and 118 may contain various configurations of gateways and/or routers.

In a preferred embodiment, the system 100 utilizes the SIP signaling protocol. SIP is described in Handley, et al., "SIP: Session Initiation Protocol," Internet Engineering Task Force (IETF) Request-for-Comments (RFC) 2543, March 1999, which is incorporated by reference herein. Other signaling protocols, such as H-323, MGCP, MEGACO, and other standard or proprietary techniques may alternatively be used.

In a SIP implementation, the first user agent 102 and the second user agent 108 each contain a SIP client and a SIP server. The first proxy server 120 and the second proxy server 124 also each contain a SIP client and a SIP server. Additional user agents may be included in the network 100, as may additional proxy servers. In addition, system 100 may also include other servers, such as registration servers, redirect servers, and/or location servers. In addition, one or more of these server types may be combined into one physical device. Moreover, although the user agents 102 and 108 are shown to be network phones, this is for exemplary purposes only, and other implementations may also be used. A typical implementation for SIP-based IP telephony would be either a system of SIP-based network phones such as the 3Com® SIP phone, offered by 3Com Corporation, the assignee of the present invention. Another typical implementation is a personal computer with software to perform SIP user agent functions, and user interface hardware, such as a microphone and headphone to serve as a means for communicating voice information. Other user interfaces, such as video and/or other types of communication data, may also be used and are intended to be within the scope of the present invention.

The system 100 may be used to implement IP telephony, as well as other telephony-related functions. Further details on how such a system operates may be found by referring to the following patent applications, assigned to the assignee of the present invention, and incorporated by reference herein:

"System And Method For Providing Access To A Content Server," to Schuster, et al., Ser. No. 09/677,077, filed Sep. 29, 2000.

"System and Method for Providing Telephone Service Having Private Branch Exchange Features in a Data Network Telephony System" to Schuster et al., Ser. No. 09/515,365, now U.S. Pat. No. 6,804,224, issued on Oct. 12, 2004_;

"System and Method for Providing A Wireless Data Network Telephone System" to Schuster et al., Ser. No. 09/515,798;

"System and Method for Accessing A Network Server Using A Portable Information Devices Through A Network Based Telecommunication System" to Schuster et al., Ser. No. 09/515,969;

"System and Method for Accessing Radio Programs Using a Data Network Telephone in A Network Based Telecommunication System" to Schuster et al., Ser. No. 09/516,269, now U.S. Pat. No. 6,914,897, issued on Jul. 5, 2005;

"System and Method for Providing Local Information in a Data Network Telephony System" to Schuster et al., Ser. No. 515,366, now U.S. Pat. No. 6,650,901, issued on Nov. 18, 2003;

"System and Method for Enabling A Portable Information Device for Use in a Data Network Telephone System" to Schuster et al, Ser. No. 09/515,795;

"Dialing Token for Initiating A Telephone Connection in a Data Network Telephone System" to Schuster et al, Ser. No. 09/515,364;

"Personalized Call Announcement on a Data Network Telephony System" to Schuster, et al., Ser. No. 09/515,387;

"Personalizing a Data Network Appliance on a Data Network Telephony System" to Schuster, et al., Ser. No. 09/515,970;

"Proximity-Based Registration on a Data Network Telephony System" to Schuster, et al., Ser. No. 09/515,796, now U.S. Pat. No. 6,857,021, issued on Feb. 15, 2005;

"System and Method for Providing User Mobility Services on a Telephony Network" to Schuster, et al., Ser. No. 09/451,388, now U.S. Pat. No. 6,446,127, issued on Sep. 3, 2002;

"System and Method for Providing Call-Handling Services on a Telephony Network" to Schuster, et al., Ser. No. 09/470,879, now U.S. Pat. No. 6,584,490, issued on Jun. 24, 2003;

"Method, Apparatus and Communications System for Companion Information and Network Appliances" to Wang, et al., Ser. No. 09/181,431, now U.S. Pat. No. 6,161,134, issued on Dec. 12, 2000;

"System and Method for Controlling Telephone Service Using a Wireless Personal Information Device" to Schuster, et al., Ser. No. 09/406,321;

"System and Method for Advertising Using Data Network Telephone Connections" to Schuster, et al., Ser. No. 09/406,320;

"System and Method for Providing User-Configured Telephone Service in a Data Network Telephony System" to Sidhu, et al., Ser. No. 09/405,283, now U.S. Pat. No. 6,744,759, issued on Jun. 1, 2004;

"System and Method for Accessing a Network Server Using a Portable Information Device Through a Network Based Telecommunication System" to Schuster, et al., Ser. No. 09/406,322;

"System and Method for Interconnecting Portable Information Devices Through a Network Based Telecommunication System" to Schuster, et al., Ser. No. 09/406,152, now U.S. Pat. No. 6,681,252, issued on Jan. 20, 2004;

"System and Method for Enabling Encryption on a Telephony Network" to Schuster, et al., Ser. No. 405,981, now U.S. Pat. No. 6,857,072, issued on Feb. 15, 2005;

"System and Method for Associating Notes with a Portable Information Device on a Network Telephony Call" to Schuster, et al., Ser. No. 09/406,151, now U.S. Pat. No. 6,795,429, issued on Sep. 21, 2004;

"System and Method for Providing Shared Workspace Services Over a Telephony Network" to Schuster, et al., Ser. No. 09/406,298;

"System and Method for Providing Service Provider Configurations for Telephones in a Data Network Telephony System" to Schuster, et al., Ser. No. 09/406,066;

"System and Method for Using a Portable Information Device to Establish a Conference Call on a Telephone Network" to Schuster, et al., Ser. No. 09/406,128, now U.S. Pat. No. 6,577,622, issued on Jun. 10, 2003;

"Multiple ISP Support for Data Over Cable Networks" to Ali Akgun, et al., Ser. No. 09/321,941;

"Method and System for Provisioning Network Addresses in a Data-Over-Cable System" to Ali Akgun, et al., Ser. No. 09/218,793, now U.S. Pat. No. 6,657,991, issued on Dec. 2, 2003; and "Network Access Methods, Including Direct Wireless to Internet Access" to Yingchun Xu, et al., Ser. No. 08/887,313, now U.S. Pat. No. 6,151,628, issued on Nov. 21, 2000.

B. Exemplary Network Telephony Call Sequence

Figure 2:
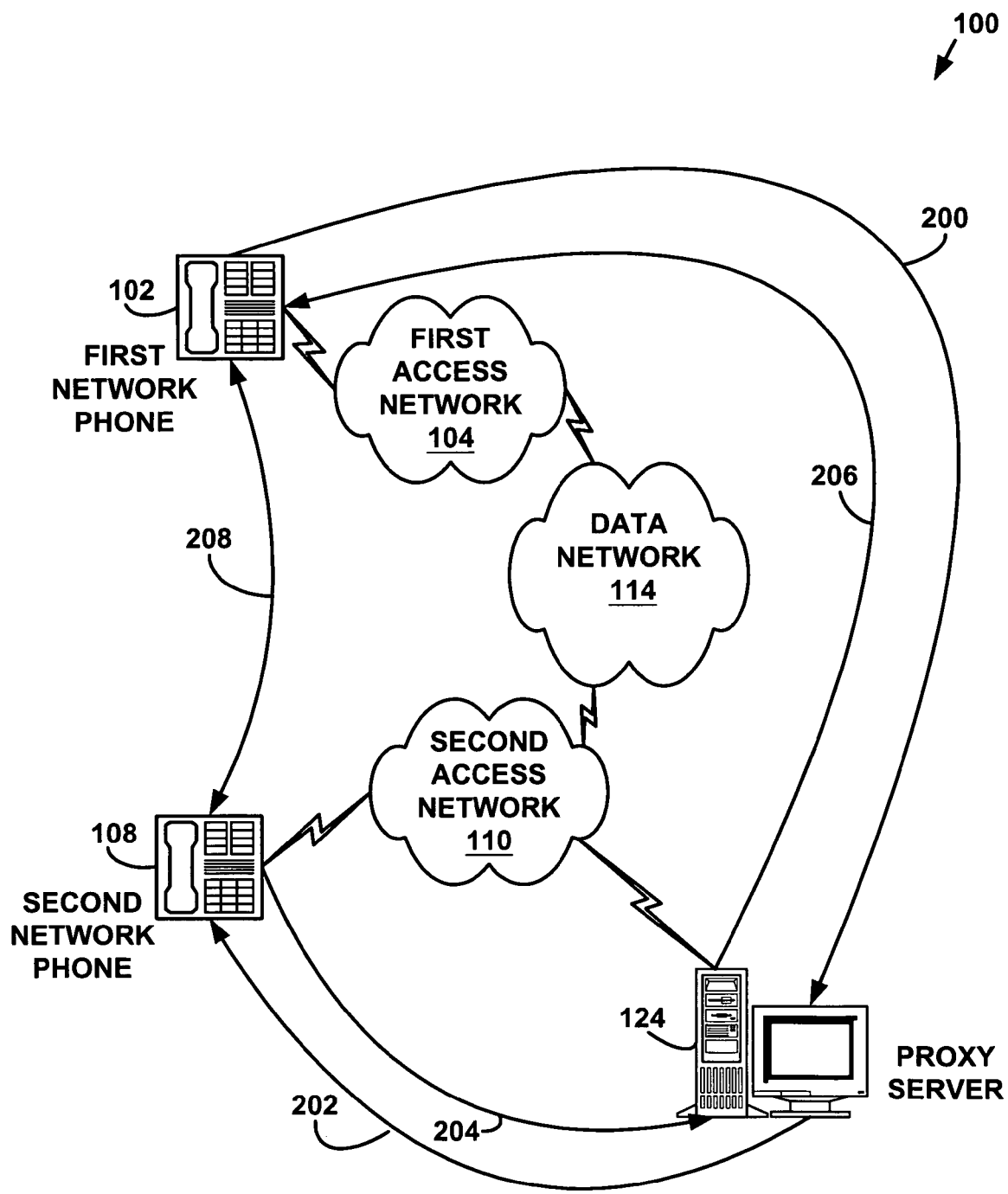
FIG. 2 is a simplified block diagram with message flow indicators illustrating the typical network telephony system in which an exemplary embodiment of the present invention can be implemented.

FIG. 2 is a simplified block diagram with message flow indicators illustrating the typical network telephony system 100 in which an exemplary embodiment of the present invention can be implemented. For the example shown in FIG. 2, the SIP signaling protocol will be used. Other signaling protocols may also be used. The first proxy server 120 (and its associated link 122) are omitted for purposes of this illustration.

A first user ("the caller") located at the first network phone 102 may call a second user ("the callee") located at the second network phone 108 according to the following procedure, described in IETF RFC 2543. The first network phone 102 transmits an INVITE request 200 to the proxy server 124 located on the second access network 110. The INVITE request 200 includes a FROM field to set forth the caller's SIP address and a TO field to set forth the callee's SIP address. The proxy server 124 will typically be located in the same domain as is specified in the TO field. The proxy server 124 may use a location service locally or remotely located to the proxy server 124 to determine the location of the callee, identified in the INVITE request 200. For example, the callee may have recently moved from one location to a second location (which may be on the second access network 110 or elsewhere). When the proxy server 124 determines that the second user is located at the second network phone 108, the proxy server 124 transmits an INVITE request 202 to the second network phone 108. The INVITE request 202 may simply be a forwarded version of the INVITE request 200, containing the SIP addresses of the caller and the callee. Upon receiving the INVITE request 202, the second network phone 108 may transmit a response message 204 to the proxy server 124. The proxy server 124 may then transmit a response message 206 back to the first network phone 102. If the transmitted response message 206 is a success response (i.e. represented by a SIP "200 OK" response), then the first network phone 102 may send an ACK message (not shown) back to the second network phone 108 to complete the call initiation process. The ACK message may be sent through the same path as the INVITE request and response messages, or it may be sent directly from the first network phone 102 to the second network phone 108, bypassing the proxy server 124. After the call has been initiated using the SIP signaling protocol, the call is connected and data (including voice information, etc.) can flow on a data channel 208 between the first network phone 102 and the second network phone 108.

SIP includes two major architectural elements: the user agent (UA) and the network server. The UA resides at the SIP end stations, (e.g. the network phones), and contains two parts: a user agent client (UAC), which is responsible for issuing SIP requests, and a user agent server (UAS), which responds to such requests. There are three different network server types: a redirect server, a proxy server, and a registrar. The various network server types may be combined into a single server. Not all server types are needed to implement the various embodiments of the present invention. The communication services to be provided will determine which servers are present in the communication system. In the example illustrated in FIG. 2, only a proxy server is shown. The present invention may be implemented in systems of varying complexity, having different combinations of server types and quantities.

The example illustrated in FIG. 2 involves a SIP UAC issuing a request, a SIP proxy server acting as an end-user location discovery agent, and a SIP UAS accepting the call. A successful SIP invitation consists of two requests: INVITE followed by ACK. The INVITE message contains a user identifier to identify the callee, a caller user identifier to identify the caller, and a session description that informs the called party what type of media the caller can accept and where it wishes the media data to be sent. User identifiers in SIP requests are known as SIP addresses. SIP addresses are referred to as SIP Universal Resource Indicators (SIP-URIs), which are of the form sip: user@host. domain. Other addressing conventions may also be used.

To be reachable at the first network phone 102, the first user may initiate a registration process, such as by entering information into the first network phone 102, or by transmitting user attributes from a portable information device (such as a Personal Digital Assistant (PDA)) to the first network phone 102 to enable registration. The first network phone 102 formats a REGISTER request that includes the user's SIP URI (or the SIP URI of the user's portable information device) in the TO field, the first network phone's SIP URI in the FROM field, and the SIP URI of a registration server (which may be colocated with the first proxy server 120 shown in FIG. 1) in the REQUEST-URI field and sends the REGISTER request to the registration server. The registration server registers the user's SIP URI with the IP address of the first network phone 102 and returns a "200 OK" response to the first network phone 102. As another alternative, a user's portable information device may be assigned a device address, such as an IP address, that is different from the device address of the first network phone 102. If a signaling protocol other than SIP is used, then the procedure may vary somewhat from the embodiment described above, which utilizes SIP.

The message sequence described above applies to the case where the SIP URI for the registration server is known. Other approaches to registration are possible, such as broadcasting to the registration multicast address "sip.mcast.net" (224.0.1.75), and are discussed in further detail in IETF RFC 2543.

Once the user's SIP URI is registered with the registration server, subsequent calls to the user's SIP URI are resolved to the address of the first network phone 102, to which the user is registered. Thus, if a call is placed to the user's SIP URI, the first network phone 102 will alert the user of an incoming call.

Redirect servers may be used to process an INVITE message by sending back the SIP-URI where the callee is reachable. Proxy servers perform application layer routing of the SIP requests and responses. A proxy server can either be stateful or stateless. A stateful proxy holds information about the call during the entire time the call is up, while a stateless proxy processes a message without saving information contained in the message. Furthermore, proxies can be either forking or non-forking. A forking proxy can, for example, ring several phones at once until somebody takes the call. Registrar servers are used to record the SIP address (SIP URI) and the associated IP address. The most common use of a registrar server is for the UAC to notify the registrar where a particular SIP URI can be reached for a specified amount of time. When an INVITE request arrives for the SIP URI used in a REGISTER message, the proxy or redirect server handles the request accordingly.

The network phones 102 and 108 in the system 100 preferably have pre-programmed device identifiers (e.g. phone numbers), represented as SIP-URI's that are of the form sip: user@domain. An example is sip: 1234567890@sample.com. After power-up, each of the network phones 102 and 108 sends a SIP REGISTER message to the default registrar. Referring back to FIG. 1, the default registrar for the first network phone 102 may be the first proxy server 120, while the second network phone 108 may register with the second proxy server 124. When a call arrives at the proxy server for any of the registered SIP URIs, the proxy server will forward the call to the appropriate destination. If a network phone is moved to a new location, all calls to the associated SIP URI will still be properly routed to that device. In other words, the system 100 provides device mobility in the sense that calls will "follow" the network phone according to its SIP URI. This is especially useful if the network phone 102 or 108 is running the DHCP (Dynamic Host Configuration Protocol) so that when the location is changed, the IP address is also automatically changed.

An advantage of the system 100 is that once the call is established between two or more network phones located, the first access network 104, the access network 110, and/or the data network 114 provide data connectivity for up to a plurality of data communications channels. For example, the network phones 102 and 108 may be operable to communicate voice signals as voice-over-data packets on a voice-over-data channel. The network phones 102 and 108 may also be operable to communicate additional types of data, such as video data on one or more additional data channels. Voice-over-data functionality preferably conforms to a protocol for formatting voice signals as digital data streams. While any suitable protocol may be used, the media (voice signal) is preferably transported via the Real Time Protocol (RTP), inside User Datagram Protocol (UDP) packets. The Internet Protocol (IP) is also preferably used. RTP is described in H. Schulzrinne et al., "RTP: A Transport Protocol for Real-Time Applications," IETF RFC 1889, January 1996, which is incorporated herein by reference. UDP is described in J. Postel, "User Datagram Protocol," IETF RFC 768, August 1980, and IP is described in J. Postel, ed., "Internet Protocol," IETF RFC 791, September 1981, both of which are incorporated by reference herein.

C. Fault Tolerant Network Telephony System

Figure 3:
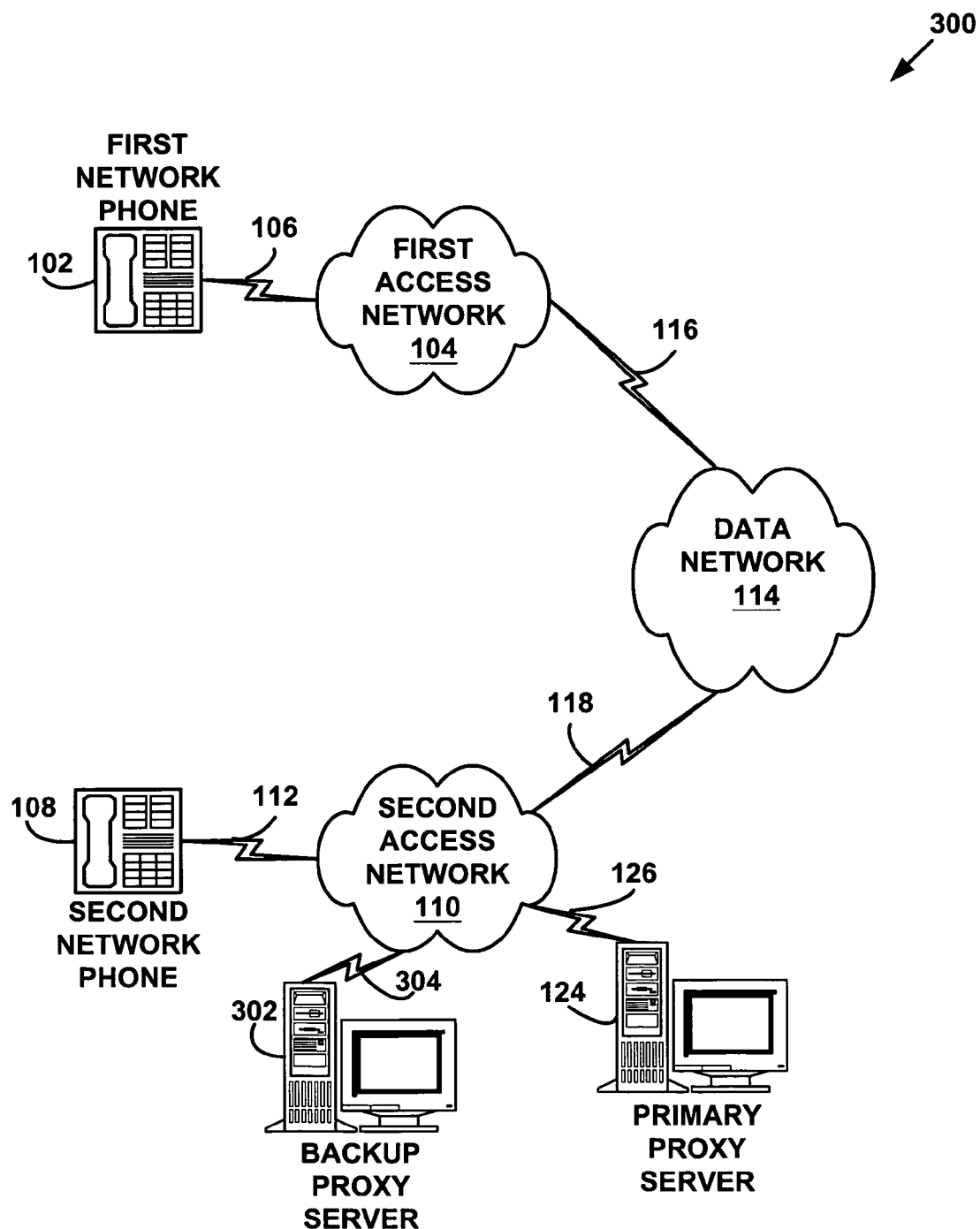
FIG. 3 is a simplified block diagram illustrating a system for providing fault tolerance in a network telephony system according to an exemplary embodiment of the present invention.

FIG. 3 is a simplified block diagram illustrating a system 300 for providing fault tolerance in a network telephony system according to an exemplary embodiment of the present invention. The system 300 includes portions of the network telephony system 100, and additionally includes a backup proxy server 302 linked to the second access network 110 by link 304. The backup proxy server 302 serves as a backup to the primary proxy server 124.

The association between the backup proxy server 302 and the primary proxy server 124 may be implemented through information communicated via the second access network 110 and the links 126 and 304. Other communication mechanisms may also be used. Alternatively, the backup proxy server 302 and the primary proxy server 124 may be associated with one another simply by their relationships to the second access network 110. In such a case, there may be no need for the primary proxy server 124 to communicate with the backup proxy server 302. The primary proxy server 124 may be responsible for handling all proxy functions, with the backup proxy server 302 operating only in case of a failure of the primary proxy server. Alternatively, the primary proxy server 124 and the backup proxy server 302 may each provide proxy functions during normal operation, with one or the other taking over if one of the proxy servers 124 or 302 should fail. Although only two proxy servers are shown, the various embodiments of the present invention are not limited in this respect. There may instead be multiple backup proxy servers. The proxy servers that are associated with each other in a fault tolerant system according to embodiments of the present invention may or may not be state-sharing.

Providing at least two proxy servers in a particular domain of a network telephony system provides a portion of a fault tolerant network telephony system according to the present invention. A second portion consists of one or more proxy servers modifying signaling messages to include information about one or more backup proxy servers. In a preferred embodiment, the signaling messages are SIP signaling messages, and various headers are modified to include the network address(es) corresponding to the one or more backup proxy servers. For example, a proxy server (such as the primary proxy server 124) may modify a signaling message to include an AlternatePath tag. The AlternatePath tag may be added to one or more headers, such as a Contact, Record-Route, Route, and/or Via header, and may be a list of network address(es) of alternative proxy servers to use in case of a failure.

Figure 4:
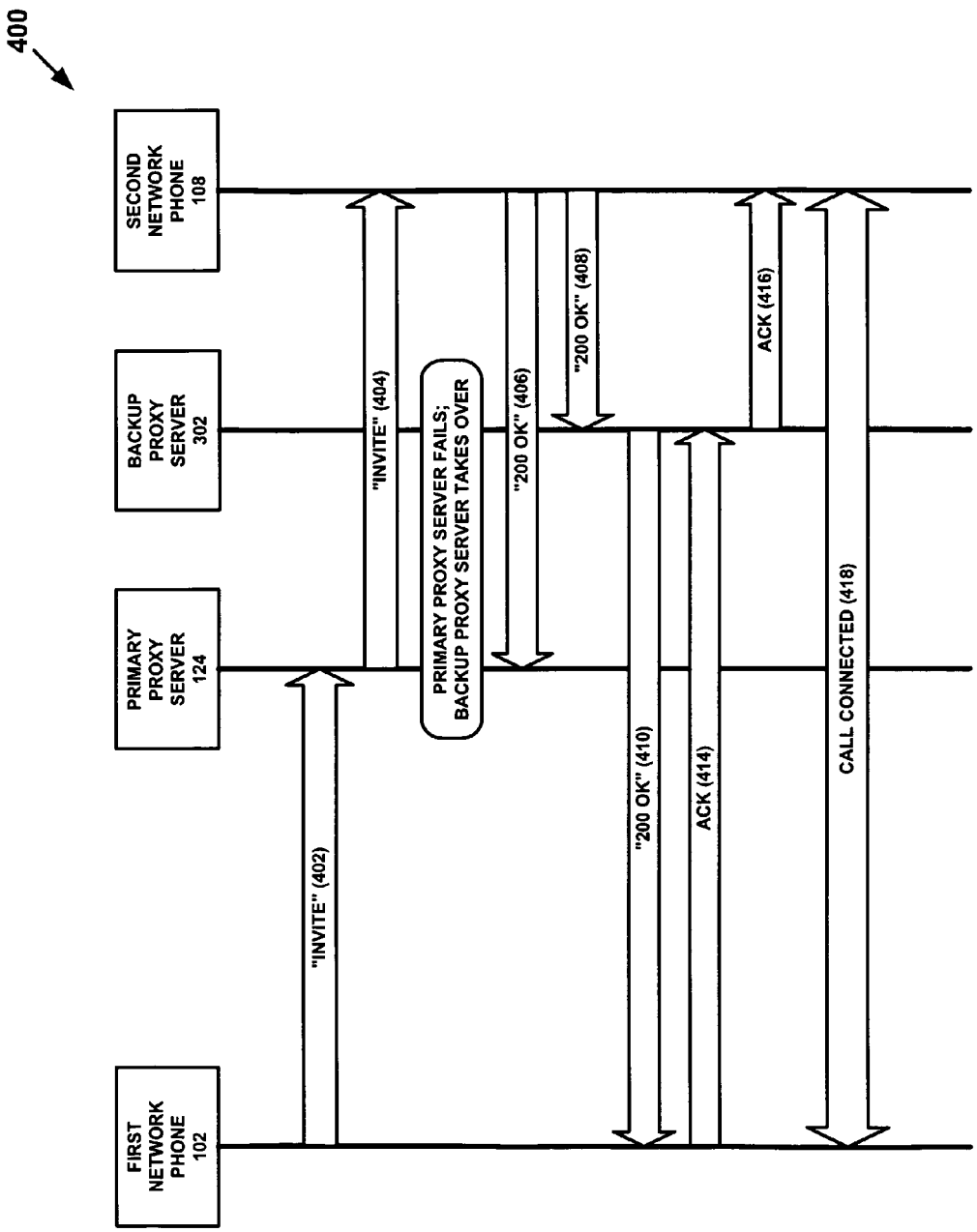
FIG. 4 is a message flow diagram illustrating a sequence of messages in a fault tolerant network telephony system, according to an exemplary embodiment of the present invention.

FIG. 4 is a message flow diagram illustrating a sequence 400 of messages in a fault tolerant network telephony system, according to an exemplary embodiment of the present invention. The exemplary sequence 400 is illustrated in terms of the SIP signaling protocol. Additional signaling protocols may also be used. Although various network entities from the system 100 are used to illustrate the sequence 400, other network entities may additionally or alternatively be included.

The first network phone 102 transmits an INVITE request 402 to the primary proxy server 124. An example of an INVITE request is shown in Table I:

TABLE I

INVITE user2@big.sample2.com
From: user1@small.sample1.com
To: user2@big.sample2.com
Call-ID: 20001010@red.big If the example of Table I is continued, it should be noted that user1 (the caller at the first network phone 102) is located in the sample1.com domain. User2 (the callee) has an address in the sample2.com domain. Assume that the primary proxy server 124, the backup proxy server 302, and the second network phone 108 are located in the sample2.com domain. Assume also that user2 is registered to the second network phone 108. The primary proxy server 124 receives the INVITE request 402 from the first network phone 102. The primary proxy server 124 determines where the callee is located, such as by accessing a location service or by examining the INVITE request itself. To implement fault tolerance, the primary proxy server adds a path attribute to the INVITE request 402. For example, the path attribute may include an AlternatePath tag that is added to a header of the INVITE message. The AlternatePath tag may, for example, be added to an extension parameter of a Contact, Record-Route, Route, or Via header. In a preferred embodiment, the AlternatePath tag includes a list of network addresses (such as IP addresses or Fully Qualified Domain Names (FQDNs)). The list may contain one or more network addresses. Table II shows examples of Contact, Record-Route, Route, and Via headers. As an alternative, the path attribute may be added as a separate header.

TABLE II

Contact: "User1" <sip:user1@small.sample1.com>;
alternatePath=backup.sample2.com
Record-Route: <sip:user1@small.sample1.com; primary.sample2.com>;
alternatePath=backup.sample2.com
Route: <sip:user1@small.sample1.com; primary.sample2.com>;
alternatePath=backup.sample2.com
Via: SIP/2.0/UDP primary.sample2.com;
alternatePath4=backup.sample2.com
Via: SIP/2.0/UDP <sip:user1@small.sample1.com>

Upon adding the path attribute to the INVITE request 402, the primary proxy server 124 transmits an INVITE request 404 to the second network phone 108. The INVITE requests 402 and 404 may be nearly identical, with the exception of the path attribute and any routing information added to the INVITE request 404.

For purposes of illustration, assume that the primary proxy server 124 fails after transmitting the INVITE request 402 to the second network phone 108, and that the backup proxy server assumes responsibility for proxy functions in the sample2.com domain. Because the second network phone 108 is unaware of the failure of the primary proxy server 124, the second network phone 108 may transmit a "200 OK" response 406 to the network address of the primary proxy server 124. Because the primary proxy server 124 is down, the second network phone 108 may receive a TCP/UDP send error or a timeout. According to the present invention, the second network phone 108 uses the network address of the backup proxy server 302, as found in the path attribute, to transmit a "200 OK" response message 408 to the backup proxy server 302.

Upon receiving the "200 OK" response message 408 from the second network phone 108, the backup proxy server 302 may then transmit a "200 OK" message 410 back to the first network phone 102. According to one embodiment of the present invention, the backup proxy server 302 first modifies a routing attribute in the "200 OK" response message 410 before transmitting it to the first network phone 102. The routing attribute may be modified by changing a routing header, to enable the first network phone 102 and/or the second network phone 108 to route any subsequent signaling messages through the backup proxy server 302 instead of through the primary proxy server 124. For example, backup proxy server 302 may modify the Record-Route, Route, and/or Via headers.

Once the first network phone 102 receives the "200 OK" response from the backup proxy server 302, the first network phone 102 may transmit an ACK message 414 to the backup proxy server 302, which may send an ACK message 416 to the second network phone 108. Alternatively, the first network phone 102 may transmit an ACK message directly to the second network phone 108. The call may then be connected to enable communication over a data channel 418.

Although the sequence 400 was described with reference to a SIP-based IP telephony system, other signaling and networking protocols may also be used. Similarly, although proxy servers and network phones were used to illustrate network elements, other types of network elements may also be used. In particular, another proxy server may perform the actions (i.e. using the network address specified in the path attribute upon receiving a failure) performed by the second network phone 108 in the sequence 400. If the MGCP signaling protocol is used, a Media Gateway Controller (MGC) may implement fault tolerant functions according to embodiments of the present invention. If MEGACO is used, a decomposed media gateway may implement fault tolerant functions according to embodiments of the present invention. The exemplary sequence 400 is not intended to limit the scope of various embodiments of the present invention.

D. Method for Providing a Fault Tolerant Network Telephony System

Figure 5:
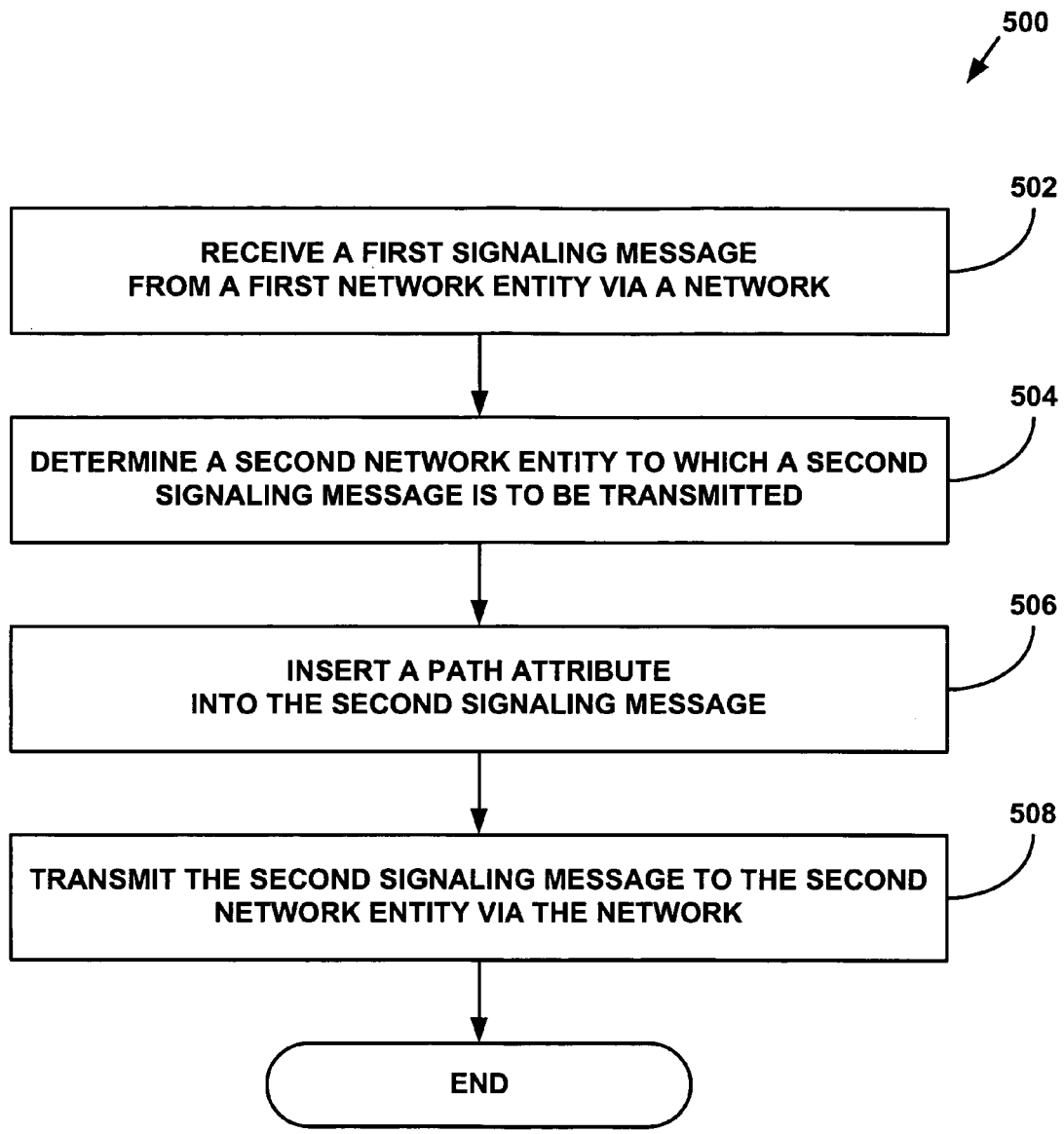
FIG. 5 is a flow diagram illustrating a method for providing fault tolerance in a network telephony system at a primary proxy server, according to an exemplary embodiment of the present invention.

FIG. 5 is a flow diagram illustrating a method 500 for providing fault tolerance in a network telephony system at a primary proxy server, according to an exemplary embodiment of the present invention. In step 502, the primary proxy server receives a first signaling message from a first network entity (such as a network phone or proxy server) via a network. In step 504, the primary proxy server determines a second network entity to which a second signaling message is to be transmitted. This may be done by accessing a location service or by examining the header of the first signaling message, for example. In step 506, a path attribute is inserted in the second signaling message. The path attribute includes at least one network address corresponding to one or more backup proxy servers. In step 508, primary proxy server transmits the second signaling message to the second network entity, such as another proxy server or a network phone.

The method 500 may be implemented in an IP telephony system for example. In a preferred embodiment, the method is implemented in a SIP-based IP telephony system, and the first and second signaling messages are SIP messages. The path attribute may include an AlternatePath tag, which may be added to a header of the second signaling message. If SIP is used, the AlternatePath tag may be added to a Contact header, a Record-Route header, a Route header, and/or a Via header. The AlternatePath tag may be added as an extension parameter to the header.

Figure 6:
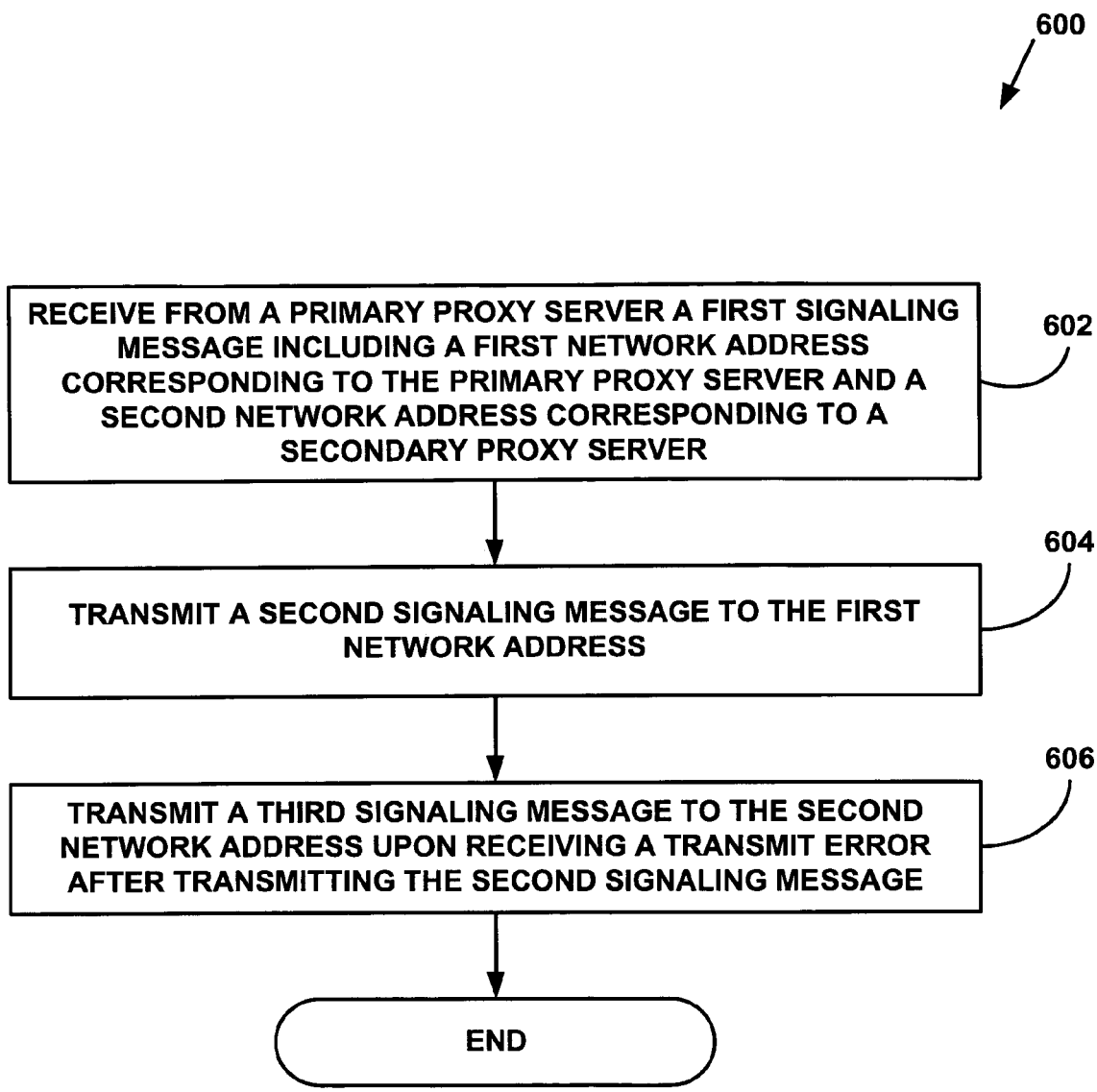
FIG. 6 is a flow diagram illustrating a method for providing fault tolerance in a network telephony system, according to an exemplary embodiment of the present invention.

FIG. 6 is a flow diagram illustrating a method 600 for providing fault tolerance in a network telephony system, according to an exemplary embodiment of the present invention. In step 602, a network entity (e.g. a network phone or proxy server) receives a first signaling message from a primary proxy server. The first signaling message includes a first network address corresponding to a primary proxy server and a second network address corresponding to a secondary proxy server. The network entity transmits a second signaling message to the first network address, as shown in step 604. If the network entity receives a transmit error (such as a UDP/TCP transmit error), or if the second signaling message times out, the network entity then transmits a third signaling message to the second network address, as shown in step 606. The third signaling message may be nearly identical to the second signaling message.

The method 600 may be implemented in an IP telephony system for example. In a preferred embodiment, the method is implemented in a SIP-based IP telephony system, and the first, second, and third signaling messages are SIP messages. The first signaling message may, for example, be an INVITE message, and the second and third signaling messages may be response messages, such as "200 OK" response messages. The path attribute may include an AlternatePath tag, which may be added to a header of the second signaling message. If SIP is used, the AlternatePath tag may be added to a Contact header, a Record-Route header, a Route header, and/or a Via header. The AlternatePath tag may be added as an extension parameter to the header.

Figure 7:
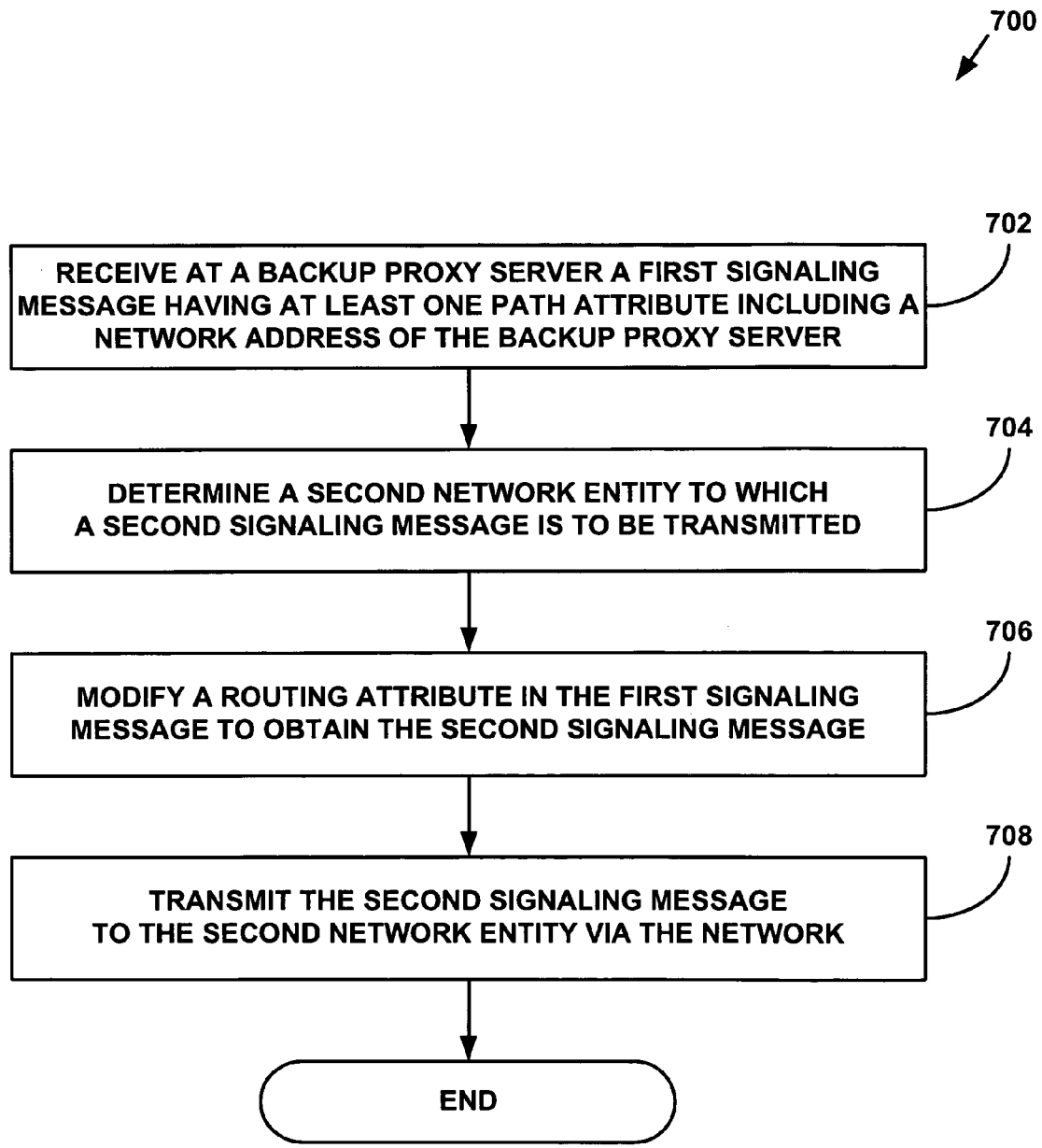
FIG. 7 is a flow diagram illustrating a method for providing fault tolerance in a network telephony system at a backup proxy server associated with a primary proxy server.

FIG. 7 is a flow diagram illustrating a method 700 for providing fault tolerance in a network telephony system at a backup proxy server associated with a primary proxy server. In step 702, the backup proxy server receives a first signaling message from a first network entity (such as a network phone or a proxy server). The first signaling message may have been transmitted to the backup proxy server because the network address of the backup proxy server is set forth in a path attribute in the first signaling message. A previous signaling message, such as one sent by the primary proxy server to the network entity, may have also contained the path entity. In step 704, the backup proxy server determines a second network entity to which a second signaling message is to be transmitted, such as by examining the first signaling message or by referring to a location service. In step 706, the backup proxy server modifies a routing attribute in the first signaling message to obtain the second signaling message. Other changes may also be made to obtain the second signaling message. In step 708, the second signaling message is transmitted to the second network entity.

The method 700 may be implemented in an IP telephony system for example. In a preferred embodiment, the method is implemented in a SIP-based IP telephony system, and the first and second signaling messages are SIP messages. The first and second signaling messages may, for example, be response messages, such as "200 OK" response messages. The path attribute may include an AlternatePath tag, which may be added to a header of the second signaling message. If SIP is used, the AlternatePath tag may be added to a Contact header, a Record-Route header, a Route header, and/or a Via header. The AlternatePath tag may be added as an extension parameter to the header. The routing attribute may be modified by changing a routing header, to enable the first network entity and/or the second network entity to route any subsequent signaling messages through the backup proxy server instead of through the primary proxy server.

Figure 8:
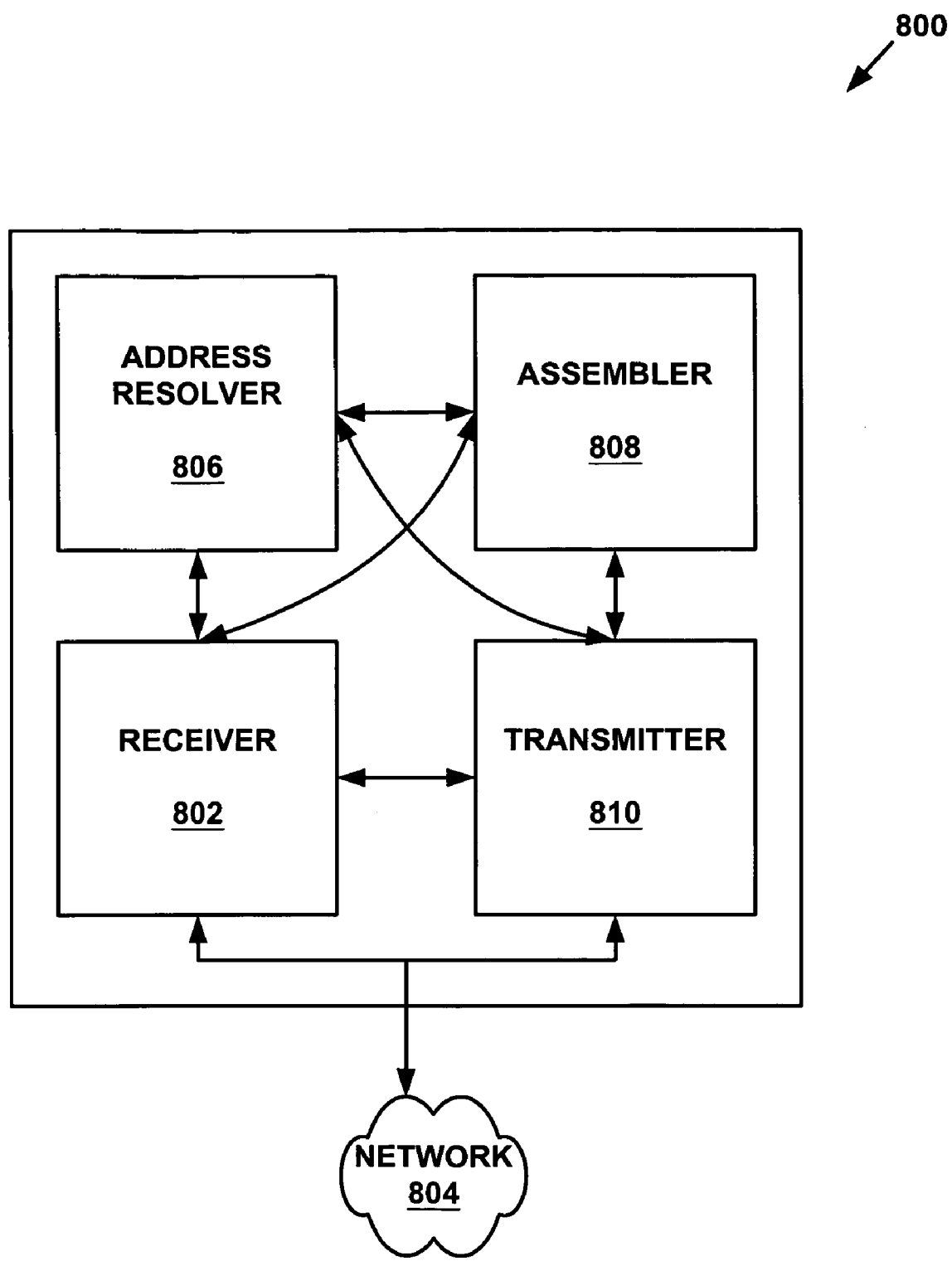
FIG. 8 is a simplified block diagram illustrating a system for providing fault tolerance in a network telephony system, according to an exemplary embodiment of the present invention.

FIG. 8 is a simplified block diagram illustrating a system 800 for providing fault tolerance in a network telephony system, according to an exemplary embodiment of the present invention. The system 800 may be a primary or backup proxy server, for example.

The system 800 includes a receiver 802 operable to receive signaling messages from other network entities via a network 804. An address resolver 806 is operable to determine a network address to which a system 800 should send one or more signaling messages. An assembler 808 creates signaling messages to be transmitted, such as by modifying received signaling messages. A transmitter 810 is operable to transmit signaling messages to other network entities via the network 804. The various components of the system 800 may be composed of software, firmware, and/or hardware, and may or may not be located within the same proximity, according to various embodiments of the present invention.

In the case where the system 800 is a primary proxy server, the assembler 808 is operable to add a path attribute to an outgoing signaling message to provide fault tolerance. The path attribute includes at least one network address corresponding to a backup proxy server. In the case where the system 800 is a backup proxy server, the assembler 808 (which may be different from an assembler in a primary proxy server) is operable to modify a routing attribute in a received signaling message to obtain an outgoing signaling message. The backup proxy server may also make additional changes to the outgoing signaling message.

Preferred and alternative embodiments of the present invention have been illustrated and described. It will be understood, however, that changes and modifications may be made to the invention without deviating from its true spirit and scope, as defined by the following claims.

What is claimed is:

1. A proxy server for providing fault tolerance in a network telephony system, comprising in combination:
    a receiver operable to receive a first signaling message from a first network entity via a network, wherein the first signaling message is transmitted from the first network entity to initiate a call with a second network entity;
    a transmitter operable to transmit a second signaling message to the second network entity via the network to initiate the call with the second network entity;
    an address resolver operable to determine the second network entity to which the second signaling message is to be transmitted; and
    an assembler operable to modify the first signaling message to obtain the second signaling message by adding at least a path attribute including at least one network address corresponding to a backup proxy server such that the second signaling message used to initiate the call with the second network entity includes the at least one network address corresponding to the backup proxy server.

2. The proxy server of claim 1, wherein the network telephony system is an Internet Protocol (IP) telephony system.

3. The proxy server of claim 1, wherein the network telephony system is an (Internet Protocol) IP telephony system in which calls are signaled according to the Session Initiation Protocol (SIP) signaling protocol, and wherein the first and second signaling messages are SIP messages.

4. The proxy server of claim 3, wherein the path attribute includes an AlternatePath tag.

5. The proxy server of claim 1, wherein the receiver, the transmitter, the address resolver, and the assembler compose a SIP proxy server.

6. A method for providing fault tolerance in a network telephony system, comprising:
    performing at a proxy server the functions comprising in combination:
        receiving a first signaling message from a first network entity via a network, wherein the first signaling message is transmitted from the first network entity to initiate a call to a second network entity;
        determining the second network entity to which a second signaling message is to be transmitted to initiate the call with the second network entity;
        modifying the first signaling message to obtain the second signaling message by inserting at least a path attribute including at least one network address corresponding to a backup proxy server such that the second signaling message used to initiate the call with the second network entity includes the at least one network address corresponding to the backup proxy server; and
        transmitting the second signaling message to the second network entity via the network.

7. The method of claim 6, wherein the network telephony system is an Internet Protocol (IP) telephony system.

8. The method of claim 6, wherein the network telephony system is an (Internet Protocol) IP telephony system in which calls are signaled according to the Session Initiation Protocol (SIP) signaling protocol, and wherein the first and second signaling messages are SIP messages.

9. The method of claim 8, wherein the path attribute includes an AlternatePath tag.

10. A computer readable medium including instructions for executing the method of claim 6.

* * * * *